United States Patent [19]
Dietz et al.

[11] 4,443,263
[45] Apr. 17, 1984

[54] SOLIDS DISPERSIONS WHICH CAN BE EASILY DISTRIBUTED IN HYDROPHOBIC AND HYDROPHILIC MEDIA AND ARE STABLE TO FLOCCULATION, AND THEIR USE

[75] Inventors: Erwin Dietz; Michael Maikowski, both of Kelkheim; Robert Gutbrod, Frankfurt am Main, all of Fed. Rep. of Germany

[73] Assignee: Hoechst AC, Frankfurt am Main, Fed. Rep. of Germany

[21] Appl. No.: 376,556

[22] Filed: May 10, 1982

Related U.S. Application Data

[63] Continuation of Ser. No. 98,755, Nov. 30, 1979, abandoned, which is a continuation of Ser. No. 856,188, Nov. 30, 1977, abandoned.

[30] Foreign Application Priority Data

Dec. 2, 1976 [DE] Fed. Rep. of Germany ....... 2654598

[51] Int. Cl.$^3$ ............................. C09K 3/00; C08K 3/04
[52] U.S. Cl. ........................... 106/287.24; 106/287.26; 106/288 B; 106/288 Q; 106/307; 106/300 N
[58] Field of Search ............... 106/307, 308 N, 288 Q, 106/288 B, 243, 287.24, 287.26

[56] References Cited

U.S. PATENT DOCUMENTS

| 2,816,046 | 12/1957 | Damusis | 106/307 |
| 2,819,174 | 1/1968 | Vartanian | 106/300 |
| 3,118,844 | 1/1964 | Forrester et al. | 252/313 |
| 3,565,658 | 2/1971 | Frazier et al. | 106/307 |
| 3,577,255 | 5/1971 | Petke | 106/308 Q |
| 3,998,652 | 12/1976 | Aign | 106/308 N |

FOREIGN PATENT DOCUMENTS 2424455 10/1975 Fed. Rep. of Germany .
861223 2/1961 United Kingdom .
1080115 8/1967 United Kingdom .

Primary Examiner—Theodore Morris
Attorney, Agent, or Firm—Curtis, Morris & Safford

[57] ABSTRACT

Stable dispersions of solids, especially pigments, are obtained by distributing a solid having acidic groups on its surface in a liquid medium comprising an amine having at least one aliphatic chain of more than 5 carbon atoms, a non-ionic and/or an anionic surfactant having one or more aliphatic chains with a total of more than 5 carbon atoms and an organic water-miscible solvent. These dispersions are easily distributable in hydrophobic and in hydrophilic systems.

17 Claims, No Drawings

SOLIDS DISPERSIONS WHICH CAN BE EASILY DISTRIBUTED IN HYDROPHOBIC AND HYDROPHILIC MEDIA AND ARE STABLE TO FLOCCULATION, AND THEIR USE

This is a continuation of application Ser. No. 98,755 filed Nov. 30, 1979 which was a continuation of appln. Ser. No. 856,188, filed Nov. 30, 1977, both now abandoned.

The present invention relates to dispersions, which are stable to flocculation, of solids which possess, on the surface, groups having an acid reaction, and to their use for tinting and/or filling hydrophobic and/or hydrophilic systems. Dispersions of solids which possess this surface property tend to flocculate particularly readily. This flocculation can take place during the dispersion process, or can take place during storage. However, it is frequently observed on stirring a solids dispersion of this type into media which are foreign to the system. These flocculation phenomena result in dispersions with a high viscosity and useless technological properties.

It has been found that dispersions which have a high stability to flocculation both when incorporated into hydrophilic media and when incorporated into hydrophobic media can be prepared from solids which possess, on the surface, groups having an acid reaction. These dispersions according to the invention contain
(a) solids with acid groups on the surface,
(b) amines with at least one aliphatic carbon chain with more than 5 carbon atoms,
(c) non-ionic and/or anionic surface-active agents with aliphatic carbon chains with more than 5 carbon atoms and
(d) water-miscible organic solvents.

The dispersions according to the invention preferably contain about 5-80% by weight of solid, 0.2-8, in particular 0.5-5, % by weight of amine, 3-25% by weight of surface-active agent and 10-85% by weight of water-miscible organic solvents, and optionally water. In addition, preferred dispersions can contain 0.05-1% by weight of preservatives.

The term "carbon chain" is to be understood as an uninterrupted arrangement of carbon atoms with single and double bonds, which can also be cyclic and can contain substituents, such as hydroxyl.

All inorganic and organic solids which are essentially insoluble in the solvent system mentioned, which can be finely distributed and which possess, on the surface, groups having an acid reaction can be used for the new dispersions. Acid groups on the surface are in general found when the solids have a pH value of less than 7 in an aqueous suspension (according to DIN 53,200). Amongst inorganic solids, this reaction occurs in the case of oxides of metals of main groups 3 to 6 and of subgroups 4 to 8. In general, it is caused by hydroxyl groups on the surface. Examples of suitable inorganic compounds for the preparation of the dispersions according to the invention are silica, alumina, antimony oxides, white pigments and colored pigments, such as titanium dioxide, iron oxide, chromium oxide and mixed oxides which contain metal oxides of this type, and solids which are coated with layers of oxides of this type.

Further examples of solids which are suitable for the preparation of the dispersions according to the invention are carbon blacks and fine-particled organic polymer particles and pigment particles which, because of the manufacturing process, oxidative after-treatment or a surface reaction, carry acid groups, such as, for example, carboxyl, lactone, hydroxyl or sulfo groups. Carbon blacks on the surface of which acid groups can be easily produced by oxidation reactions are to be mentioned in particular.

Preferred amines correspond to the general formula

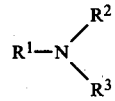

in which $R^1$ is an aliphatic, araliphatic or cycloaliphatic radical with a carbon chain of at least 5, preferably 10–25, carbon atoms and the carbon chain of which can contain one or more double bonds and also hydroxyl groups, and in which $R^2$ and $R^3$ are hydrogen atoms, aliphatic, araliphatic or cycloaliphatic radicals having a carbon chain with 1–30 carbon atoms, $-(CH_2)_nOH$ or $-(CH_2)_2NH_2$ groups, it being possible for n to assume values from 1–6.

Examples which may be mentioned are hexylamine, cyclohexylamine, octylamine, decylamine, dodecylamine, tetradecylamine hexadecylamine, octadecylamine, octadecenylamine, eicosylamine, docosylamine, dodecylaniline, and derivatives obtained therefrom which possess alkyl, benzyl, hydroxy-ethyl or aminopropyl groups instead of both or one of the amino hydrogen atoms. Fatty amines and their derivatives are particularly suitable, such as, for example, cocoamine, laurylamine, cetylamine, stearylamine, tallowamine, oleylamine, stearylmethylamine, distearylamine, di-tallowamine, dimethyl-soyaamine, dimethyllauryamine, laurylpropylenediamine, N-tallowtrimethylene-diamine, dihydroxyethyloleylamine and dihydroxyethylcocoamine. Free amines are preferably used; acids or further bases may be present, but in general this is not advantageous.

Anionic and non-ionic surface-active agents which possess, inter alia, a medium-chain or long-chain aliphatic hydrocarbon radical are suitable for the solids dispersions according to the invention. Examples of non-ionic surface-active agents which have proved suitable are alkoxylation products of alkylphenols, fatty alcohols, fatty amines and fatty acids, in particular reaction products of nonylphenol, tributylphenol, coconut fatty alcohol, lauryl alcohol, stearyl alcohol and oleyl alcohol with 2 to 30, preferably 5 to 20 moles of ethylene oxide. Anionic surface-active agents which may be mentioned are alkyl-sulfates, alkylsulfonates, alkylbenzenesulfonates and condensation products of fatty acids and taurine or hydroxyethanesulfonic acid, as well as reaction products of ethoxylated alkylphenols and fatty alcohols with chlorosulfonic acid, especially lauryl-sulfates and dodecylbenzenesulfonates. The anionic and non-ionic surface-active agents can be used alone or as mixtures.

Solids dispersions with particularly good properties are obtained if amines and anionic or non-ionic surface-active agents with the same or a similar aliphatic radical are employed for the preparation.

Suitable solvents are organic compounds which are completely water-miscible or are water-miscible to a limited extent. Solvents which prevent or delay drying up of the solids dispersions are preferably used, such as, for example, glycols and acid amines, in particular ethylene glycol, propylene glycol, hexylene glycol, diethylene glycol, dipropylene glycol, polyethylene glycols polypropylene glycols, formamide and N-methylpyrrolidone. For the preparation of the dispersions according to the invention, they can be used alone or mixed with one another or with water.

The dispersions are prepared in a manner which is in itself known, depending on the particle hardness of the solids employed, for example using dissolvers, rotator-stator mills, ball mills and pearl mills, in high-speed turbulent mixers or kneading apparatuses or on roll mills. Auxiliaries, such as, for example, preservatives, can be added to the dispersions during the dispersing process or thereafter.

The solids dispersions according to the invention are distinguished by very good rheological properties and high stability on storage, even in the case of a high solids content. They can be distributed extremely easily in the most diverse hydrophilic and hydrophobic media without flocculation phenomena thereby occurring. If pigments are used as the solids, pigment toner pastes with a high tinctorial strength and brightness are obtained with the claimed compositions.

In order to demonstrate the wide possibilities of application and the high stabilities to flocculation, in each case three media are chosen for test purposes from the numerous hydrophilic and hydrophobic media. This choice is only for illustration and is in no way a limitation of the universal use possibilities of the solids dispersions according to the invention.

Test Media: (A) One test medium is an emulsion paint based on polyvinyl acetate, containing 20 parts of stabilized rutile pigment, 24 parts of extender pigments (predominantly dolomite), 40 parts of a commercially available polyvinyl acetate dispersion suitable for emulsion paints (®Mowilith DM2HB) and 0.16 part of a methylhydroxyethylcellulose which has an average viscosity of 2 Pas in a 2% strength aqueous solution at 20° C. Water and the customary stabilizing agents account for the remaining 15.84 parts.

(B) Another is an emulsion paint based on acrylic resin, containing 20 parts of stabilized rutile pigment, 24 parts of extender pigments (predominantly dolomite), 40 parts of commercially available acrylic resin dispersion suitable for emulsion paints (®Rhoplex AC34) and 0.33 part of a methylhydroxyethylcellulose which has an average viscosity of 4 Pas in a 2% strength aqueous solution at 20° C. Water and the customary stabilizing agents account for the remaining 15.67 parts.

(C) Exterior wall paint based on polyvinyltoluene/acrylate, containing 15 parts of stabilized rutile pigment, 34 parts of extender pigments (predominantly dolomite), 7 parts of a commercially available vinyltoluene/acrylate copolymer suitable for exterior wall paints (®Pliolite VTAC-L), 14 parts of a 10% strength solution of a commercially available modified vinyltoluene/acrylate copolymer suitable for exterior wall paints (Pliolite AC-3) in a mixture of aromatic and aliphatic hydrocarbons, and 30 parts of a mixture consisting of stabilizing agents, chloroparaffin and white spirit.

(D) Another is an air drying alkyd resin lacquer, containing 30 parts of stabilized rutile pigment, 37.5 parts of long-oil alkyd resins based on vegetable fatty acids and 32.5 parts of a mixture consisting of driers, stabilizing agents, white spirit and crystal oil.

(E) Another is a black emulsion paint based on polyvinyl acetate, containing 0.7 part of furnace black, 1 part of stabilized rutile pigment, 43.3 parts of extender pigments (predominantly dolomite), 40 part of a commercially available polyvinyl acetate dispersion suitable for emulsion paints (Mowilith DM2HB) and 0.2 part of a methylhydroxyethylcellulose which has an average viscosity of 4 Pas in a 2% strength aqueous solution at 20° C. Water and the customary stabilizing agents account for the remaining 14.8 parts.

(F) Another is a black air-drying alkyd resin lacquer, containing 5 parts of lamp black, 40 parts of a short-oil alkyd resin based on vegetable fatty acids and 55 parts of a mixture consisting of driers, stabilizing agents, xylene, white spirit and butylglycol.

In order to test for suitability, the solids dispersions described in the Examples which follow are manually stirred into, in each case, a hydrophilic and a hydrophobic test medium using a glass rod provided with a rubber policeman. If the solids are colored pigments, the concentration of the solids dispersion is chosen so that the white pigment/colored pigment ratio in the colored test medium is 10:1 in the case of inorganic colored pigments and 50:1 in the case of carbon blacks. If the solids are white pigments, 10 parts of the solids dispersion are stirred into 100 parts of the black-colored test media. After stirring in for 3 minutes, the test medium is applied onto white art carton using a film applicator. In order to test the stability to flocculation, after drying for a short period, part of the film is subsequently rubbed with a brush or with the finger. If a flocculation process took place on stirring the solids dispersion into the test medium, the flocculated pigment is at least partially de-agglomerized by the shearing forces exerted on the film. The surface which has been subsequently rubbed is then more deeply colored than the surface which has not been after-treated. This "rub-out test" is particularly suitable as a simple test method for tinting pastes.

In the Examples which follow, parts denote parts by weight.

The pH value of the aqueous solids suspensions are determined according to DIN No. 53,200, but polyethylene vessels were used in the determinations which follow. The shaking time was increased to 15 hours.

Thus the determination was carried out as follows:

1.0 g of the pigment sample is weighed into a 50 ml polyethylene measuring vessel which can be closed (sparingly wettable pigments being made into a paste in the measuring vessel with an amount of ethanol sufficient for wetting) and 20 ml of freshly distilled or completely desalinated water, at room temperature, which has been rendered free from carbon dioxide beforehand by boiling for a short time, are added. The measuring vessel is immediately closed, shaken vigorously for 15 hours and left to stand for 5 minutes. The measuring vessel is then opened, the pH sensor (glass electrode single member measuring cell or glass electrode with a reference electrode) is immersed for one minute and the pH value is read off on the pH meter. At least two such determinations are carried out.

EXAMPLE 1a 650 parts of a titanium dioxide pigment, which has been after-treated with aluminum compounds and silicon compounds and gives a pH value of 6 in an aqueous suspension, are stirred in portions, using a blade stirrer, into a mixture consisting of 20 parts of oleylamine, 80 parts of an adduct of 10 moles of ethylene oxide onto 1 mole of oleyl alcohol, and 250 parts of diethylene glycol. This mixture is passed through a rotorstator mill until a particle fineness $<2\mu$ is obtained.

A pigment dispersion of excellent flow is obtained which can be very easily distributed free from specks in the test media E and F without the slightest flocculation phenomenon thereby occurring.

COMPARISON EXPERIMENT 1b

If the 20 parts of oleylamine in Example 1a are replaced by 20 parts of an adduct of 10 moles of ethylene oxide and 1 mole of oleyl alcohol, a highly viscous, thixotropic dispersion is obtained which can be distributed in test medium F only with great difficulty. The rub-out test shows significant flocculation phenomena.

EXAMPLE 2a 500 parts of iron oxide black, which gives a pH value of 5 in an aqueous suspension, are introduced in portions into a mixture consisting of 20 parts of octadecylamine, 90 parts of an adduct of 15 moles of ethylene oxide and 1 mole of stearyl alcohol, 90 parts of an adduct of 5 moles of ethylene oxide and 1 mole of oleyl alcohol, 150 parts of propylene glycol and 150 parts of diethylene glycol, and the mixture is stirred, using a dissolver, down to a particle fineness $<2\mu$.

The dispersion with very good flowability thus obtained can be particularly easily distributed in test media A and D, and leads to excellent rub-out tests in medium A and to good rub-out tests in medium D.

COMPARISON EXPERIMENT 2b

If the 20 parts of octadecylamine in Example 2a are replaced by 10 parts of an adduct of 15 moles of ethylene oxide and 1 mole of stearyl alcohol and 10 parts of an adduct of 5 moles of ethylene oxide and 1 mole of oleyl alcohol, a thixotropic dispersion which flows poorly is obtained which can be readily distributed in test medium A but, as a result of severe flocculation phenomena, can be distributed in medium D only very poorly.

EXAMPLE 3a

A dispersion consisting of 500 parts of iron oxide brown which has a pH value of 4 in an aqueous suspension, 15 parts of cocoamine, 185 parts of an adduct of 10 moles of ethylene oxide and 1 mole of cocoalcohol, 149 parts of dipropylene glycol, 149 parts of ethylene glycol and 2 parts of a fungicide is prepared according to Example 2a.

In this manner, a dispersion with good rheological properties is obtained which can be particularly easily distributed free from specks in test media B and C without the slightest flocculation phenomenon thereby occurring.

COMPARISON EXPERIMENT 3b

If the 15 parts of cocoamine in Example 3a are replaced by 7 parts of dipropylene glycol and 8 parts of ethylene glycol, a dispersion is obtained which, in contrast to Example 3a, flocculates when stirred into test medium C.

EXAMPLE 4a

A dispersion consisting of the following components is prepared as in Example 2a: 300 parts of iron oxide yellow, which has a pH value of 5 in an aqueous suspension, 20 parts of coco-amine, 180 parts of an adduct of 10 moles of ethylene oxide and 1 mole of coconut fatty alcohol, 250 parts of formamide and 250 parts of N-methylpyrrolidone.

This dispersion possesses good rheological properties and can be easily distributed and has a high stability to flocculation in test media B and C.

EXAMPLE 4b

A dispersion with comparably good properties as that in Example 4a is obtained by replacing coco-amine by tallow-amine and replacing formamide and N-methylpyrrolidone by 350 parts of hexylene glycol and 150 parts of water.

EXAMPLE 4c

A dispersion with a particularly high stability to sedimentation is obtained if, in Example 4a, tallow-propylenediamine is used instead of coco-amine and the mixture of formamide and N-methylpyrrolidone is replaced by 200 parts of polypropylene glycol (molecular weight 750), 200 parts of polyethylene glycol (molecular weight 200) and 100 parts of water.

COMPARISON EXPERIMENT 4d

By replacing coco-amine in Example 4a by 20 parts of an adduct of 10 moles of ethylene oxide and 1 mole of coconut fatty alcohol, a dispersion which has insufficient ease of distribution and low stability to flocculation in test medium C is obtained.

EXAMPLE 5a 300 parts of a lamp black, which has a specific surface area, measured by the BET method, of 47 $m^2/g$ and a pH value of 4 in an aqueous suspension, are kneaded in a 'Z' blade mixer for 1 hour, with the addition of 20 parts of stearylamine, 104 parts of sodium dodecylbenzenesulfonate, 225 parts of ethylene glycol and 56 parts of water. The kneaded mixture is diluted by adding 145 parts of ethylene glycol, 148 parts of water and 2 parts of a fungicide.

The dispersion with very good flow prepared in this manner can be exceptionally easily distributed in test media A and C without the slightest flocculation phenomenon thereby occurring.

COMPARISON EXPERIMENT 5b

If the stearylamine in Example 5a is replaced by ethylene glycol, a dispersion with distinctly poorer ease of distribution in both test media is obtained. The rub-out tests show slight flocculation phenomena in test media A and severe flocculation phenomena in test medium C.

EXAMPLE 6a 220 parts of a channel black with a specific surface area, measured by the BET method, of 87 $m^2/g$ and a pH value of 4.5 in an aqueous suspension, 10 parts of oleylamine, 160 parts of an adduct of 10 moles of ethylene oxide onto 1 mole of nonylphenol, and 137 parts of ethylene glycol are made into a paste and kneaded for 1 hour in a 'Z' blade mixer, and the mixture is then diluted with 273 parts of ethylene glycol, 198 parts of water and 2 parts of a fungicide to give a dispersion with very good flowability.

This dispersion can be easily incorporated into test medium D and very easily incorporated into test medium A. The rub-out tests show a good stability to flocculation in medium D and an excellent stability to flocculation in medium A.

COMPARISON EXPERIMENT 6b

If the 10 parts of oleylamine in Example 6a are replaced by 10 parts of ethylene glycol, a thixotropic dispersion is obtained which has poor ease of distribution and low stability to flocculation in test media A and D.

EXAMPLE 7a 400 parts of a furnace black, which has been subjected to oxidative after-treatment and has a specific surface area, measured by the BET method, of 37 m$^2$/g and a pH value of 3 in an aqueous suspension, are stirred in portions into a solution of 15 parts of tallow-trimethylene-diamine, 50 parts of an adduct of 6 moles of ethylene oxide and 1 mole of tributylphenol, 50 parts of an adduct of 18 moles of ethylene oxide and 1 mole of tributylphenol and 2 parts of a fungicide in 250 parts of ethylene glycol and 233 parts of water. This mixture is ground in a pearl mill, using 1 mm siliquartzite beads, until a particle fineness <2µ is achieved.

The dispersion thus obtained is distinguished by very good rheological properties, particularly good ease of distribution in test media B and C and good stability to flocculation in medium C, as well as outstanding stability to flocculation in medium B.

COMPARISON EXPERIMENT 7b

By replacing tallow-trimethylene-diamine in Example 7a by 15 parts of water, a paste is obtained which can be incorporated into test media B and C only with great difficulty. The rub-out tests show severe flocculation phenomena.

EXAMPLE 8

The dispersions described in the Table which follows are prepared, with a channel black which has been subjected to oxidative after-treatment and has a specific surface area, measured by the BET method, of 470 m$^2$/g and a pH value of 2.5 in an aqueous suspension, in a 'Z' blade mixer. In addition to the substances listed in the Table, all the dispersions contain 120 parts of carbon black, 160 parts of an adduct of 10 moles of ethylene oxide and 1 mole of oleyl alcohol, 298 parts of water and 2 parts of a fungicide.

The rheological properties of the carbon black dispersions and the ease of distribution and the resistance to flocculation of the carbon black dispersions in test media B and C are given figures of merit from 1 to 6: 1=excellent, 2=very good, 3=good, 4=moderate, 5=poor and 6=very poor.

| Example No. | Amine content parts | Amine | Other additives parts | Ethylene glycol content parts | Rheological properties | Ease of distribution in medium B | Ease of distribution in medium C | Resistance to flocculation in medium B | Resistance to flocculation in medium C |
|---|---|---|---|---|---|---|---|---|---|
| 8a | — | — | — | 420 | 1 | 6 | 6 | 6 | 6 |
| 8b | — | — | 30% strength NaOH, 40 | 380 | 6 | 5 | 5 | 5 | 5 |
| 8c | 15 | cyclohexylamine | — | 405 | 5 | 4 | 4 | 4 | 4 |
| 8d | 20 | octylamine | — | 400 | 2 slightly thixotropic | 4 | 4 | 4 | 4 |
| 8e | 40 | distearylamine | — | 380 | 5 | 2 | 3 | 2 | 3 |
| 8f | 40 | stearylmethyl-amine | — | 380 | 2 slightly thixotropic | 1 | 2 | 2 | 2 |
| 8g | 40 | dimethyl-(soya alkyl)-amine | — | 380 | 3 thixotropic | 1 | 2 | 2 | 2 |
| 8h | 50 | dihydroxyethyl-oleylamine | — | 370 | 3 thixotropic | 1 | 2 | 2 | 2 |
| 8i | 40 | oleylamine | — | 380 | 1 | 1 | 1 | 1 | 2 |
| 8k | 40 | oleylamine | 30% strength NaOH, 20 | 360 | 2 slightly thixotropic | 1 | 1 | 1 | 2 |
| 8l | 40 | oleylamine | acetic acid, 10 | 370 | 2 slightly thixotropic | 1 | 2 | 2 | 2 |

EXAMPLE 9a 200 parts of a silica, which has been obtained by flame hydrolysis and has a surface area, measured by the BET method, of 145 m$^2$/g and a pH of 4 in an aqueous suspension, are introduced in portions into a mixture consisting of 40 parts of oleylamine, 160 parts of an adduct of 10 moles of ethylene oxide onto 1 mole of nonylphenol, and 133 parts of ethylene glycol in a 'Z' blade mixer. After a kneading time of 1 hour, the kneaded mixture is diluted with 167 parts of ethylene glycol, 298 parts of water and 2 parts of a preservative.

The solids dispersion prepared in this manner possesses excellent rheological properties. If some of this dispersion is stirred into 5 parts of the carbon black dispersion 8a, the ease of distribution and the resistance to flocculation of the carbon black dispersion are significantly improved. For this reason the silica dispersion is particularly suitable for letting down pigment dispersions. In addition, it can be used for wetting and dispersing solids, in particular pigments.

COMPARISON EXPERIMENT 9b

If the oleylamine in Example 9a is replaced by 40 parts of an adduct of 10 moles of ethylene oxide and 1 mole of nonylphenol, a highly viscous, very thixotropic paste is obtained which impairs the technological properties of carbon black dispersion 8a when admixed to this dispersion.

We claim:

1. A dispersion of a solid having acidic groups on its surface in a liquid medium, said solid constituting 5 to 80% by weight of said dispersion, and said medium consisting essentially of
    (a) a fatty amine constituting 0.2 to 8% by weight of said dispersion and having the formula

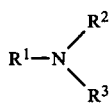

wherein $R^1$ is an aliphatic, araliphatic or cycloaliphatic radical, having a chain of from ten to twenty-five carbon atoms containing up to three carbon-carbon double bonds or said chain substituted by hydroxy, and wherein $R^2$ and $R^3$, which are the same or different, is each hydrogen or an aliphatic, araliphatic or cycloaliphatic radical of from one to thirty carbon atoms or is a group of the formula —$(CH_2)_n$—OH or —$(CH_2)_n$—$NH_2$ in which n is from one to six with the proviso that at least one or two of $R^1$, $R^2$ and $R^3$ is an alkyl or alkenyl residue of from ten to twenty-five carbon atoms;
    (b) a nonionic surfactant selected from the group consisting of an adduct of 5 to 20 moles of ethylene oxide onto an alkylphenol and of an adduct of 5 to 20 moles of ethylene oxide onto a fatty alcohol, or a mixture thereof, or an anionic surfactant selected from the group consisting of an alkylsulfate, alkylsulfonate and alkylbenzene sulfonate, or a mixture thereof, or a combination of said nonionic and anionic surfactants, these surfactants constituting 3 to 25% by weight of said dispersion and having one or more aliphatic chains with a total of more than 5 carbon atoms and
    (c) a water miscible organic solvent constituting 10 to 85% by weight of said dispersion.

2. A dispersion as claimed in claim 1, wherein said acidic groups are selected from the group consisting of hydroxy, carboxy and sulfo.

3. A dispersion as claimed in claim 1, wherein said solid is carbon black having acidic groups on its surface.

4. A dispersion as claimed in claim 1, wherein said solid is a metal oxide.

5. A dispersion as claimed in claim 4, wherein said said metal oxide is iron oxide.

6. A dispersion as claimed in claim 4, wherein said metal oxide is titanium oxide.

7. A dispersion as claimed in claim 6, wherein said titanium oxide is coated with silica.

8. A dispersion as claimed in claim 1, wherein said solid is an organic pigment.

9. A dispersion as claimed in claim 1, wherein said solid is coated with a metal oxide.

10. A dispersion as claimed in claim 1, wherein said solid is coated with silica.

11. A dispersion as claimed in claim 1, containing additionally water and/or a preservative.

12. A dispersion as claimed in claim 1, wherein said solid is a metal oxide, carbon black or inorganic pigment.

13. A dispersion as claimed in claim 1, wherein $R^1$ has 10 to 25 carbon atoms.

14. A dispersion as claimed in claim 1, wherein the solvent is a liquid capable of retarding the drying of the dispersion.

15. A dispersion as claimed in claim 1, wherein the solvent is a glycol or an acid amide.

16. A dispersion as claimed in claim 15, containing 0.5 to 5% by weight of amine.

17. A dispersion as claimed in claim 15, containing water and/or from 0.05 to 1% by weight of a preservative.

* * * * *